US007698394B2

(12) United States Patent
Helmerich (10) Patent No.: US 7,698,394 B2
(45) Date of Patent: Apr. 13, 2010

(54) GLOBAL NETWORK MANAGEMENT CONFIGURATION

(75) Inventor: Lawrence Helmerich, Sylmar, CA (US)

(73) Assignee: Alcatel Lucent, Paris (FR)

( * ) Notice: Subject to any disclaimer, the term of this patent is extended or adjusted under 35 U.S.C. 154(b) by 1395 days.

(21) Appl. No.: 10/745,743

(22) Filed: Dec. 23, 2003

(65) Prior Publication Data

US 2005/0198215 A1    Sep. 8, 2005

(51) Int. Cl.
*G06F 15/177* (2006.01)
*G06F 15/173* (2006.01)

(52) U.S. Cl. ..................... 709/222; 709/224
(58) Field of Classification Search ............ 709/201, 709/220, 221, 223, 222
See application file for complete search history.

(56) References Cited

U.S. PATENT DOCUMENTS

| 5,838,907 | A  | * | 11/1998 | Hansen ................. 709/220 |
| 6,286,038 | B1 | * | 9/2001 | Reichmeyer et al. ........ 709/220 |
| 6,301,612 | B1 | * | 10/2001 | Selitrennikoff et al. ...... 709/220 |
| 6,351,751 | B1 | * | 2/2002 | Traversat et al. ......... 707/103 Y |
| 6,622,170 | B1 |   | 9/2003 | Harrison et al. |
| 6,625,258 | B1 |   | 9/2003 | Ram et al. |
| 6,760,761 | B1 | * | 7/2004 | Sciacca .................. 709/220 |
| 6,978,301 | B2 | * | 12/2005 | Tindal .................. 709/223 |
| 7,143,153 | B1 | * | 11/2006 | Black et al. ............. 709/223 |
| 7,219,257 | B1 | * | 5/2007 | Mahmoud et al. .......... 714/6 |
| 7,318,148 | B2 | * | 1/2008 | Scheibli ................ 713/1 |
| 7,444,393 | B2 | * | 10/2008 | Chung .................. 709/222 |
| 2002/0099787 | A1 | * | 7/2002 | Bonner et al. ............ 709/216 |
| 2002/0147813 | A1 | * | 10/2002 | Teng et al. .............. 709/225 |
| 2002/0174232 | A1 | * | 11/2002 | Kikuta et al. ............ 709/227 |
| 2004/0064550 | A1 | * | 4/2004 | Sakata et al. ............ 709/224 |
| 2005/0044197 | A1 | * | 2/2005 | Lai .................... 709/223 |
| 2006/0265482 | A1 | * | 11/2006 | Trisno et al. ............ 709/222 |

FOREIGN PATENT DOCUMENTS

EP    1026867 A    8/2000

OTHER PUBLICATIONS

Yeh Y-S et al, "Applying Lightweight Directory Access Protocol Service on Session Certification Authority", Computer Networks, Elsevier Science Publishers B.V., Amsterdam, NL, vol. 38, No. 5, Apr. 5, 2002, pp. 675-692, XP004342875, ISSN: 1389-1286.

* cited by examiner

*Primary Examiner*—Jeffrey Pwu
*Assistant Examiner*—Shaq Taha
(74) *Attorney, Agent, or Firm*—Raymond M. Galasso; Galasso & Associates, LP (57) ABSTRACT

A method and system are disclosed for remotely storing information for initializing a configurable network device at a direct server in the network. The information for initializing the configurable network device is automatically retrieved and used by the network device to self-initialize after the network address of the directory server is provided. Included in the information in some embodiments are the network addresses of a policy server and an authentication server, thereby allowing the network device to automatically retrieve policy information and authentication information as needed. Remote storage of substantially all information used to setup and run the network device substantially reduces the effort needed to backup or change information for large distributed networks including numerous configurable network devices.

17 Claims, 8 Drawing Sheets

GLOBAL NETWORK MANAGEMENT CONFIGURATION

FIELD OF INVENTION

The invention relates generally to the management of distributed network devices. In particular, the invention relates a method and system for remotely storing at a network server substantially all the information used by a network device, such as a multi-layer switch, for initialization.

BACKGROUND

Distributed networks, including local area networks (LANs), wide area networks (WANs), metropolitan area networks (MANs), and the Internet, for example, are comprised of "nodes" interconnected by various transmission media. The term nodes refers broadly to a wide range of network devices such as: (a) computers and workstations; (b) switching devices, including bridges, multi-layer switches, and routers; and (c) special purpose devices including file servers and directory serves, for example. Many of these devices require numerous pieces of information in order to complete some form of set up procedure and make the device operational. This information, collectively referred to herein as device-specific setup (DSS) information or DSS data herein, required to make the device operational varies depending on the function of the device and its complexity.

The DSS information used by a switch generally includes information in traps, VLAN assignments, spanning tree information, routing tables, ATM circuit setup, and network management commands, for example. Being device-specific, the DSS generally differs from one device to the next. In a switch, for example, the DSS includes a listing of adjacent devices operatively coupled to the switch—including the make and model and port information—which is unique for each switch in the network. In modern switches, substantially all DSS data necessary to make a switch operational is retained at the switch in an information base in local memory. This DSS information is provided as input when the switch is installed and brought online.

In addition to the DSS information, a switch may also require various shared resources, including policy information and authentication information, for example. Policy information may include quality-of-service assignments, and authorization information generally includes account names, passwords, and access rights that restrict access to a network device such as a switch. The policy and authentication information is sometimes stored in one or more central databases referred to herein as shared resource servers. In particular, policy information is stored in a policy server while authorization information is stored at an authorization server. The shared resource servers generally maintain policy and authentication information for a multiplicity of devices.

There are four main problems with approaches presently known in the art. First, all the DSS information must be fed to each network device upon initialization of the device. This typically requires that the network administrator manually enter the information at the switch and or download the DSS information to the switch. This procedure must be repeated for each configurable device in the network, which is both labor intensive and susceptible to human error. Consider, for example a network including 100 switches which all use a common authentication server. After the authentication files are set up, each one of the 100 switches must be issued a set of commands instructing it to direct authentication information queries to the authentication server. While such commands are supported by various management protocols including the Simple Network Management Protocol (SNMP), the command that may differ from one switch to the next. As such, the network administrator may need to be familiar with the multiplicity of commands necessary to properly manage the devices.

The second problem is that modification of the network device configuration is extremely burdensome. To designate a new authentication server, for example, a set of commands informing each switch of the new authentication must be issued to each of the 100 switches. To compound the difficulty, one or more of those switches may be down or unreachable, making it necessary for the administrator to return to and update any previously-unavailable switch once it becomes reachable. Changing the policy server presents a similar level of difficulty.

Third, generating a backing up copy of DSS information for a large network is also overly burdensome. A back up copy of the DSS information must generally be acquired for every switch individually. There are presently no known procedures for simultaneously backing up substantially all the DSS information for a plurality of switches.

Fourth, designing and coding a network management system (NMS) to control or otherwise interface with a plurality of switches having different configuration requirements, different software installations, and different interfaces is unnecessarily difficult. To be useful, for example, a conventional NMS must be designed to support a large number of devices, whether or not those devices are in the client's subnet or are presently under the management of the NMS.

There is therefore a need for a system for conveniently storing, downloading, accessing, modifying, and backing up large quantities of DSS information for at least one managed network device.

SUMMARY

The invention in its several embodiments features method for the automated set-up a configurable network device (CND) where the CND has associated with it device-specific setup information (DSSI). The CND is operably coupled to a distributed network comprising a DSSI server having a DSSI server identifier, a policy server having a policy server identifier, and an authentication server having an authentication server identifier. The method of the preferred embodiment comprises the steps of storing substantially all the DSSI, including the policy server identifier and authentication server identifier, at the DSSI server; inputting the DSSI server identifier to the CND; and retrieving the DSSI for the configurable switching device from the DSSI server. Once the policy server identifier and authentication server identifier have been retrieved, policy information is retrieved from the policy server and authentication information is retrieved from authentication server. The process by which information is retrieved from the various servers preferably occurs automatically upon initialization and boot-up of the CND, or periodically depending on the kind of data and the frequency with which it changes.

The CND in the preferred embodiment is a multi-layer switching device. The DSSI server, in turn, may be employed to retain the DSSI of a plurality of switching devices, thereby allowing a network administrator to efficiently backup and modify initialization and operational parameters for one or more devices without contacting each of the network devices individually.

BRIEF DESCRIPTION OF THE DRAWINGS

The present invention is illustrated by way of example and not limitation in the figures of the accompanying drawings, and in which.

DETAILED DESCRIPTION

Figure 1:
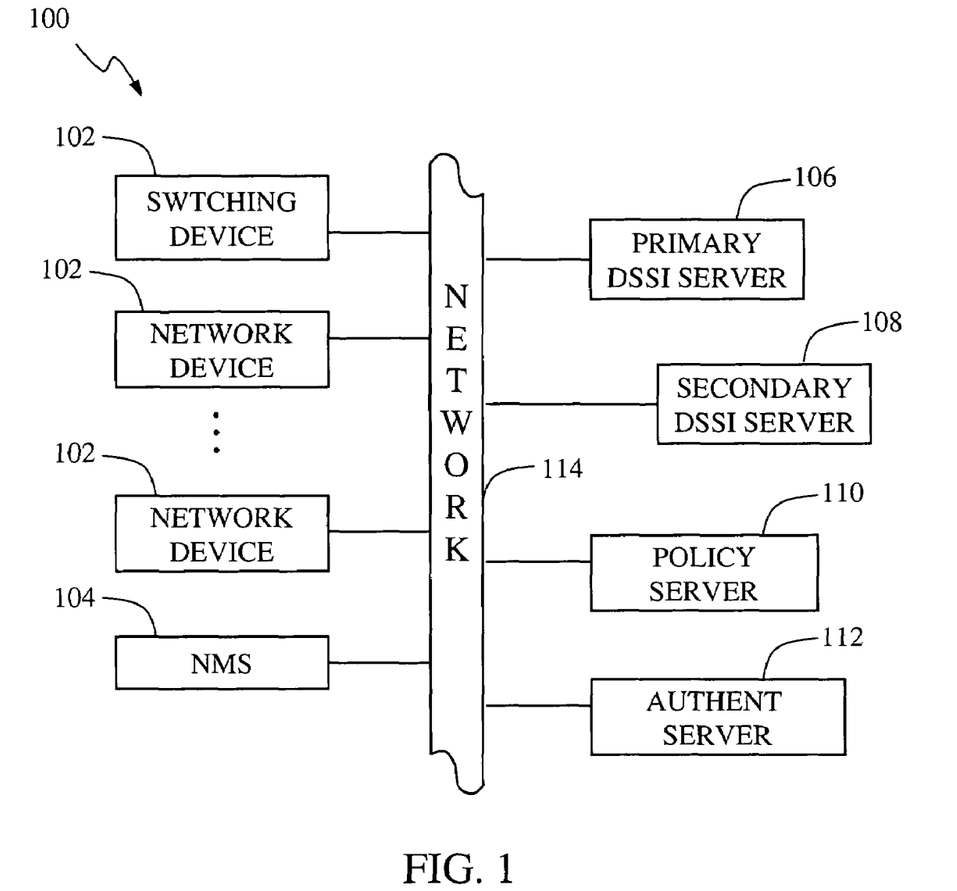
FIG. 1 is a network topology in which the automated-configuration procedure is employed, according to the preferred embodiment of the present invention.

Illustrated in FIG. 1 is a distributed network topology comprising one or more network devices with which the automated-configuration procedure may be implemented. The network 100 generally includes one or more packet-switched network components including a LAN, a WAN, or a MAN, an intranet, the Internet, or a combination thereof. Operatively coupled to the network 100 are a plurality of nodes including one or more network devices 102 requiring DSS data, at least one data store 106, and a network management system.

The network devices 102, CNDs, are any of a variety of devices that require DSSI. DSSI or DSS data (DSSD) as used herein collectively refers to the one or more parameters, settings, or variables that need be assigned or otherwise inputted in order to initialize, boot, start, or, in some cases, continual operation a configurable network device. DSS information for a multi-layer switching device generally includes, but is not limited to:

System settings such as VLAN assignments, spanning tree, routing tables, description, contact, and location;
Chassis and interface settings such as Ethernet port configuration;
IP routing information such as RIP, OSPF, BGP, VRRP, IP-ROUTING and IPMR; IPX routing, VLAN settings such as the creation and deletion of VLANS, modification of VLAN identifications, type, spanning tree state, mobility, router protocol, and authentication;
DSS policy information including the location of the policy server, such as the server IP address and port number; the base address if the policy server is an LDAP server; and a user name, password, authentication certificate, or combination thereof to access the policy server; International Electrical and Electronic Engineers (IEEE) 802.1Q information including VLAN association rules;
DSS authorization and security settings regulating file transfer protocol (FTP) access or simple network management protocol (SNMP) access including, for example, the location of the authentication server, such as the server IP address and port number; the base address if the authentication server is an LDAP server; a user name, password, authentication certificate, or combination thereof to access the authentication server; access rights either permitting or denying access for different access modes, e.g., FTP, TELNET, SNMP, secure shell (SSH), and console;
Trap information including a trap server address or the identification of other clients interested in receiving traps from the particular CND;
Accounting settings;
Simple Network Management Protocol (SNMP);
Server load balancing properties enabling a server, for example, to perform load balancing with one or more additional servers;
Web accesses properties including the Web server configuration of the present node and other nodes;
Domain Name Service (DNS);
Group Mobility Advertisement Protocol;
VLAN advertisement Protocol; and
ATM setup information.

A compilation of DSS information pertaining to a particular CND is then referred to herein as a DSS information base (DIB). There may be a unique DIB including one or more DSS information files for each of the configurable network devices within the network 100.

Any number of different configurable devices may be adapted to perform the automated-configuration procedure of the present invention, including bridges, mulit-layer switches, routers, servers, work stations, Voice-over-Internet Protocol (IP) devices, traffic classifiers, accounting devices, editing devices, and address look-up devices, for example. In the preferred embodiment, at least one of the configurable devices 102 is a multi-layer switching device adapted to perform layer 2 through layer 7 packet switching operations as defined in the Open Systems Interconnect (OSI) reference model. A modern switching device 102 may require a DIB adapted to retain approximately ten megabytes or more of configuration data to allow the device to be fully operational or operate optimally.

Associated with each of the one or more configurable devices is one or more DSSI stores. The primary purpose of the one or more DSSI stores is to retain and provide access to substantially all DSS data for one or more configurable network devices. In the preferred embodiment, the DSSI store is a primary DSSI server (DIS) 106 that retains the DIB containing substantially all the DSS information used by the switching device 102 for initialization, installation, or continuous operation of the device. Prior to downloading the DSSI from the DSSI store 106, the DIS is associated with the switching device 102 by assigning an DSSI identifier, preferably a network address, that points to the DIS 106. A secondary DSSI server 108 comprising a substantially identical copy of the primary DSSI server 106 information base may also be used to provide an alternative source of information if the primary DSSI server 106 fails or is otherwise inaccessible. With the network address of one or more DIS 106, 108 assigned, the switching device 102 is able to retrieve DSS information at initialization and during continuous operations, as described in more detail below.

In addition to the types of DSS information identified above, a DSSI server 106, 108 in the preferred embodiment may further include one or more shared resource server identifiers that point to one or more shared resource servers (SRSs) used to store the policy information and authentication information. The policy information may define traffic classification and quality-of-service (QoS), for example, and the authentication information used to control access to one or more CNDs. The authorization information may include the account names, passwords, and privileges necessary to restrict access to the one or more configurable devices 102, for example.

The DSSI server 106 in the preferred embodiment is a directory server enabled with the Lightweight Directory Access Protocol (LDAP). LDAP servers are particularly well suited to the preferred embodiment due to "read-many-write-few" character of the DSS data. One skilled in the art will recognize that there are a number of suitable alternative server-types that may be adapted to retain DSS information depending on the character of data and the frequency with which it is read or updated.

The network 100 further comprises a network management system (NMS) 104 from which a network administrator can in the preferred embodiment remotely login and maintain the one or more configurable devices 102, the one or more DSSI servers 106, 108, and the one or more shared resource servers 110, 112. The NMS 104, the one or more configurable devices, the one or more DSSI servers, and the one or more shared resource servers are preferably enabled with a management protocol such as SNMP.

Figure 2:
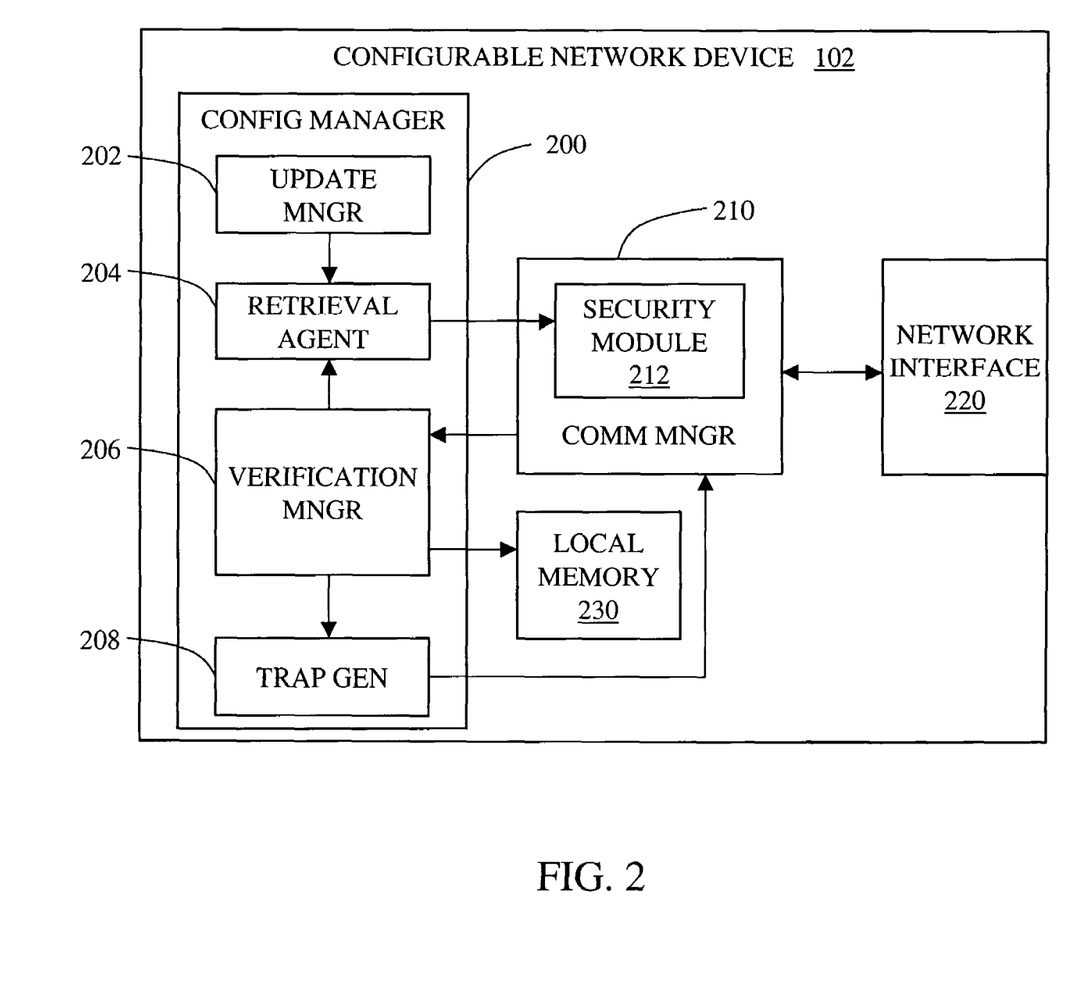
FIG. 2 is a functional block diagram of a switching device adapted to perform the automated-configuration procedure, according to the preferred embodiment of the present invention.

Illustrated in FIG. 2 is a functional block diagram of a configurable network device adapted to perform the automated CND setup procedure. The CND 102 of the preferred embodiment comprises a configuration manager 200, a communications manager 210, and a network interface 220. The configuration manager 200 comprises an update manager 202, retrieval agent 204, verification manager 206, and trap generator 208. The update manager 202 monitors one or more polling intervals discussed in more detail below to determine when to request updated DSS information from the primary DSSI server and the scope of that request. When appropriate, the update manager 202 signals the retrieval agent 204 to generate a DSSI request message. The DSSI request preferably requests substantially all the DSS information upon initialization of the CND, although only updated DSS information may be required once the operational state is achieved. The DSSI request generated by the retrieval agent 204 is transmitted to a communications manager 210, namely a security module 212, where the request is encoded and encapsulated with the server identifier prior to being transmitted via the network interface 220.

In response to the update request, the CND 102 may receive DSS information from the associated DSSI server 106, policy information from the policy server 110, or authentication information from the authentication server 112. Each of the modules in the configuration manager consults the communication manager 210 to verify that the proper access rights are being used. For example, communications manager 210, which is operably connected to the network interface 220, confirms whether a user has the privileges necessary to read or write data at the communications manager 210 and confirms the integrity of the response at the verification manager 210. If the DSS data is corrupted, the verification manager 210 causes the retrieval agent 204 to retransmit the DSSI request. If intact, the verification manager 206 causes the DSS information to be retained in the internal local memory 230, which may further include the computer-readable instructions used to execute the automated CND setup procedure of the preferred embodiment of the present invention. In the preferred embodiment, the trap generator 208 issues a trap when there is a change to the configuration or when an attempt to update the configuration fails.

Figure 3:
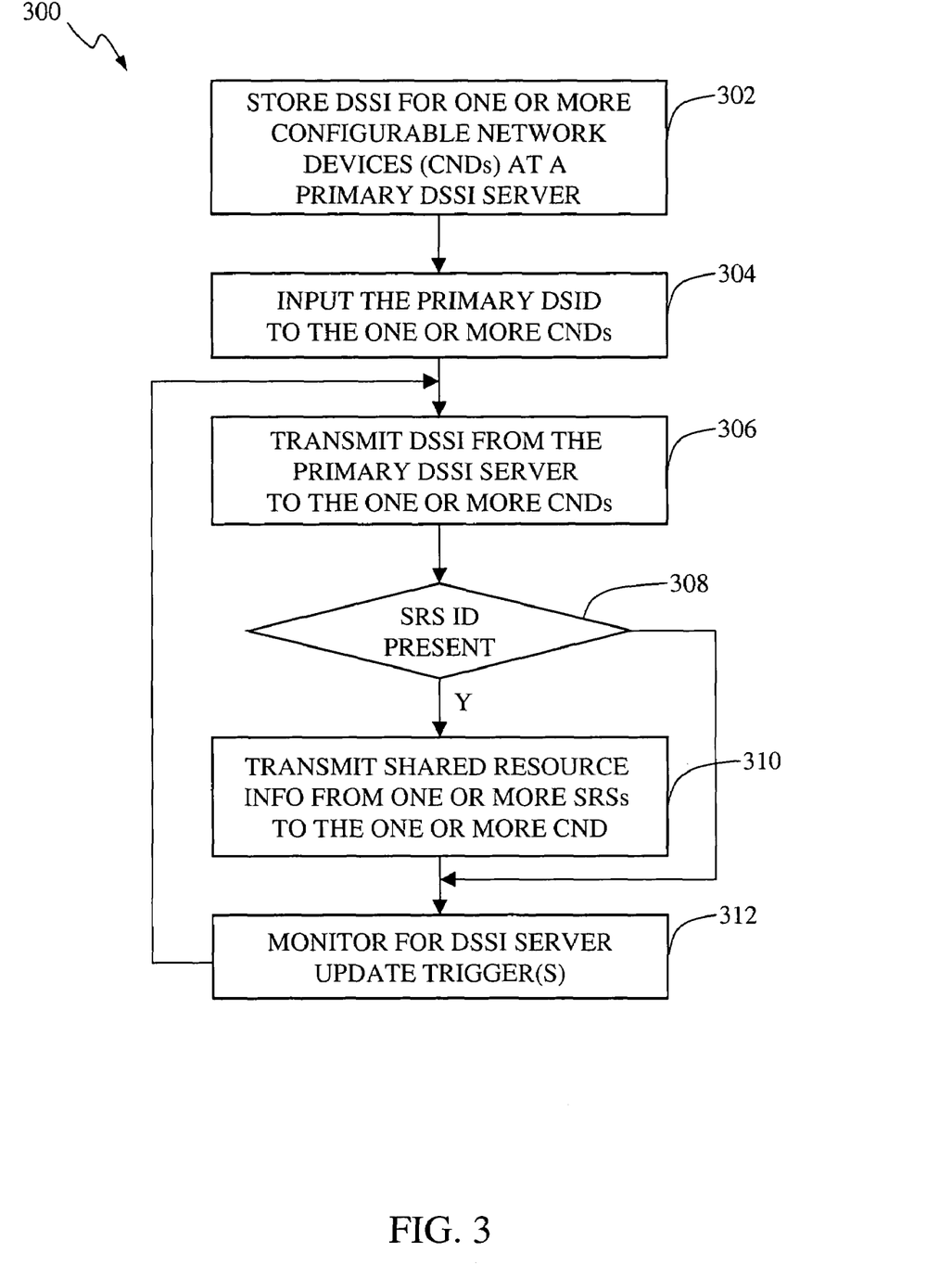
FIG. 3 is a flow chart of the method for performing the automated configurable network device setup, according to the preferred embodiment of the present invention.

Illustrated in FIG. 3 is a flow chart of the method for performing the automated CND setup. As part of the initial setup, one or more DSSD data associated with one or more configurable devices 102A-102C is stored to a primary DSSI server (step 302). The DSS information is directly or remotely uploaded to the primary DSSI server 106 by means of the NMS 104. The identity of the primary DSSI server 106 is also registered with or assigned at the one or more clients thereof. The primary DSSI server identification (DSID) (step 304) is preferably the IP address of the primary DSID 106, although other means by which a client may locate the associated sever may also be available. The primary DSID is generally provided by the network administrator when the switching device 102 is initialized. In some embodiments, additional DSS information is provided in the input step 304, including, for example, the IP address or hostname of the CND 102, a backup DSSI server identifier, DSSI update parameters including the frequency with which the network device is to poll the DSSI server 106, and polling parameters including the maximum number of polling retries to be attempted by a CND prior to timing-out. Note that DSS information storing step 302 and primary DSID registration step 304 may occur in either order, or occur substantially contemporaneously.

Subsequent to, and preferably in response to, registration of the DSID (step 304), a configurable device polls the associated primary DSSI server 106 for purposes of downloading the appropriate DSS information. The DSS information retrieved from the primary DSSI server 106 in the transmitting step 306 preferably includes, but is not limited to, VLAN configuration information and other forms of system information. A CND preferably transfers substantially all configuration information pertaining to the particular CND at initialization and when the CND undergoes a boot-up procedure. For continuous operation in the preferred embodiment, however, only the DSS information that has changed since the previous download is transferred to the CND.

In those embodiments employing one or more shared resource servers in addition to the DSSI server 106, the DSS information retained at the primary DSSI server 106 preferably includes a shared resource server (SRS) identifier, preferably an IP address for locating the one or more SRSs. If one or more shared resource server (SRS) identifiers is present in the DSS information retained on the primary DSSI server, the SRS testing 308 is answered in the affirmative and shared resource information retained in the SRSs is pulled down by the CND. The configurable network device may then retain a local copy of the DSS and SRS information in cache for purposes of initialization, boot-up, start-up, or continued operations.

In the absence one or more SRS identifiers, the SRS testing 308 is answered in the negative and the automated CND setup method 300 proceeds to the monitoring step 312 in which the CND waits for one or more update triggers. Upon detection of an update trigger, some or all the DSS information is again transmitted from the primary DSSI server 106 to one or more CNDs.

Figure 4:
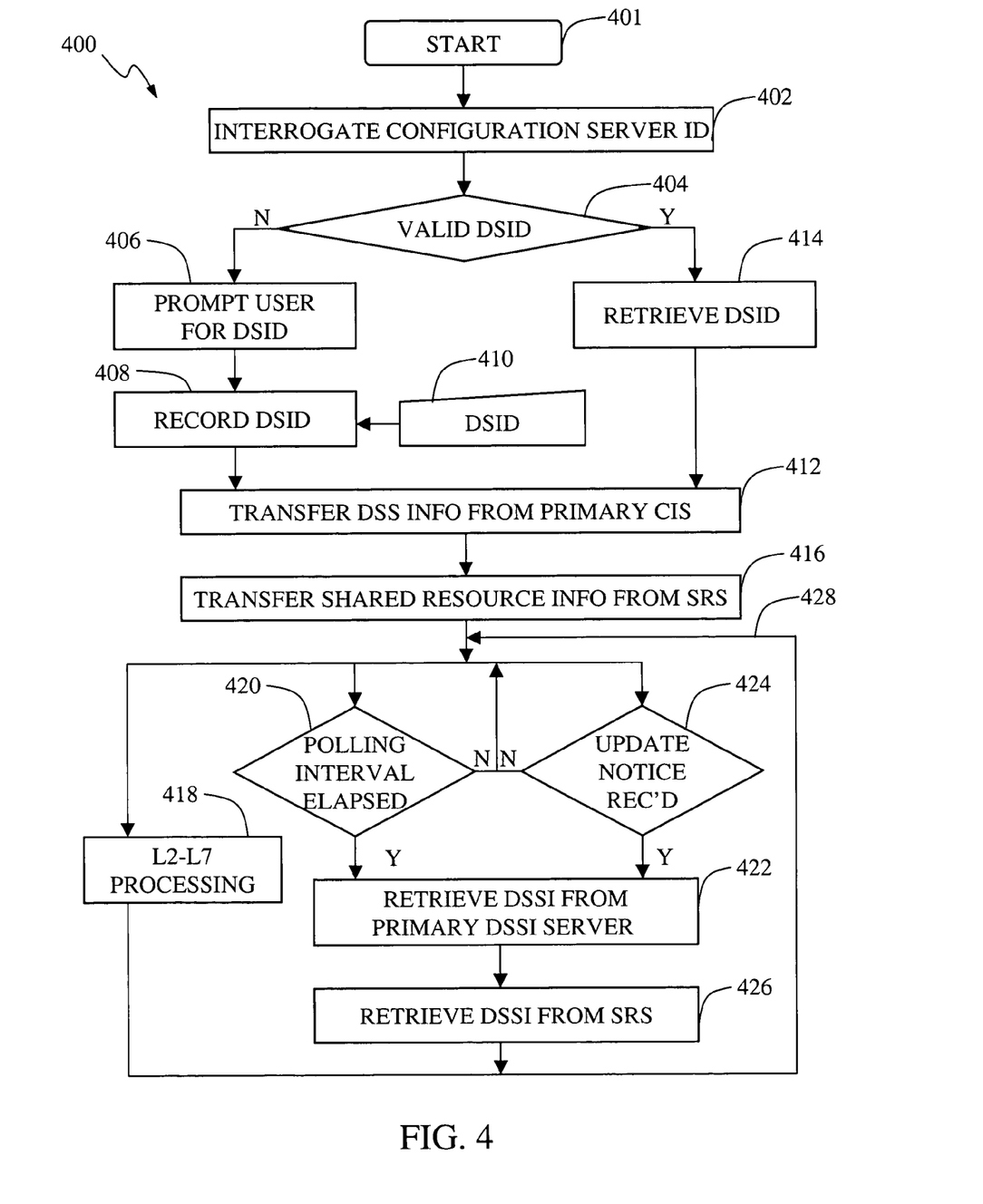
FIG. 4 is a flow chart of the method for performing the automated CND setup for a switching device, according to the preferred embodiment of the present invention.

Illustrated in FIG. 4 is a flow chart of the method for performing the automated CND setup procedure for a switching device. Upon initialization or boot-up 401, the switching device 102A in step 402 interrogates the internal memory 230 for a DSS information server identifier, preferably the IP address of the primary DSSI server 106. Since the primary DSID is generally assigned by the administrator upon initialization of the switching device 102A, the first test for a valid DSID retrieves a null value and the DSID testing 404 is answered in the negative. In response, the switching device 102A preferably prompts the network administrator for a valid DSID (step 406) or, in some embodiments, issues a trap. When a valid DSID is assigned (step 410), the switching device 102A proceeds to record (step 408) the DSID to internal memory 230 for subsequent DSSI retrievals. In some embodiments, the automated CND setup procedure further includes one or more security steps that elicit account and password information, for example, necessary to access, view, or modify one or more configuration parameters on the switching device 102A.

If the switching device 102A had been initialized previously, the test for a valid DSID (step 404) is answered in the affirmative and the DSID retrieved from internal memory 230 (step 414) used to generated one or more update messages that cause DSS information previously at the primary DSSI server 106 to be transferred to the switching device 102A (step 412). In the preferred embodiment, the transfer is enabled by one or more LDAP message exchanges between the switching device 102A and the DSSI server 106. The DSSI server 106 may be adapted to report substantially all the DSS information pertaining to the switching device 102A, or only that which has changed or been modified since the last previous update.

If the DSS information retrieved from DSSI server 106 includes the identifier of one or more SRSs, such as policy server 110 or authorization information server 112, shared resource information pertinent to the switching device 102A is also downloaded to and cached in the switching device 102 (step 416). As with the primary DSSI server, the SRSs may be adapted to report substantially all the shared resource information required by the switching device 102, or only that information that has been modified or otherwise changed since the last query by the switching device 102A.

The one or more DSSI servers preferably employs an LDAP information model to retain the DSS information. The LDAP information model is based upon entries that represent a collection of information about an object. Each entry comprises a set of attributes, each attribute comprising an attribute type and one or more associated values. The type represents the kind of information while the value is the actual data. The set of possible values for a given attribute type is defined by an associated syntax. In the preferred embodiment, the plurality of DSS entries are adapted to store the setup information of a of a plurality of CNDs within the network 100 using a common DSS template or trie.

Upon receipt of the DSS data and shared resource data, the switching device 102 is adapted to automatically process the data according to the hardware, software, and firmware specifications of the switching device 102 with minimal intervention by the administrator or network management system 104. That is to say, it is more efficient to use a switching device to configure itself than to use a network management tool to provide the proper commands for what may be a large number of CNDs in the network. As such, the time and level of familiarity with the switching device 102 necessary for an administrator to configure the switching device is significantly reduced over that of existing systems.

After the switching device 102 has automatically processed the DSS information and shared resource information, as prescribed in the preferred embodiment, the switching device 102 transitions into an operational mode. In the operational mode, the switching device 102 is, preferably, fully configured and functioning as a multi-layer switch with layer 2 through layer 7 packet processing capabilities. Updated or modified DSS information is also transmitted to the switching device 102 at periodic intervals or upon occurrence of a pre-determined event in the manner described below. Note however that while some switches are adapted to exchange topology information and routing tables, for example, this information may constitute DSS information if it is retained at and retrieved from a DSSI server along with substantially all other DSS information required by the switching device.

In the preferred embodiment, the switching device 102 periodically polls the primary DSSI server 106 to request DSS information that has changed or been modified since the last transmission. The polling interval is preferably one example of DSSI retained at the DSSI server 106 and included in a previous download (step 412), although it may also be provided by the network administrator at the time of setup. Upon the expiration of a pre-defined "polling interval" or other expiration condition, preferably every 5 minutes to 60 minutes, the polling interval testing step 420 is answered in the affirmative and the switching device retrieves the DSSI (step 422) from the associate primary DSSI server in step 422. The information retrieved may be limited to that information that has changed, or include substantially all the information associate with the switching devices stored therein. If the DSS information includes an identifier associated with one or more SRSs, the switching device 102 may also retrieve the shared resource information (step 426). Note also that different elements of the DSSI may be polled at different rates depending on the frequency at which the data changes. Policy information, for example, is more likely to change than say authentication information.

In some embodiments, the automated CND setup procedure is adapted to retrieve DSS information and or shared resource information upon receipt of an update notification message indicating when the information has been changed at the server. Some contemporary directory servers are able to generate such a notification automatically in response to a change in the data retained therein. Upon receipt of such an update notification message, the update notice test 424 is answered in the affirmative and the automatic DSSI setup procedure retrieves the appropriate DSSI 422 and shared resource information 426 from one or more servers in the manner described above.

In the operational mode, the packet switching and routing (step 418) and DSS information retrieval (steps 420, 422, 424, 426) occur substantially concurrently, as indicated by return path 428, until switching device 102 is powered down or otherwise disabled.

Figure 5:
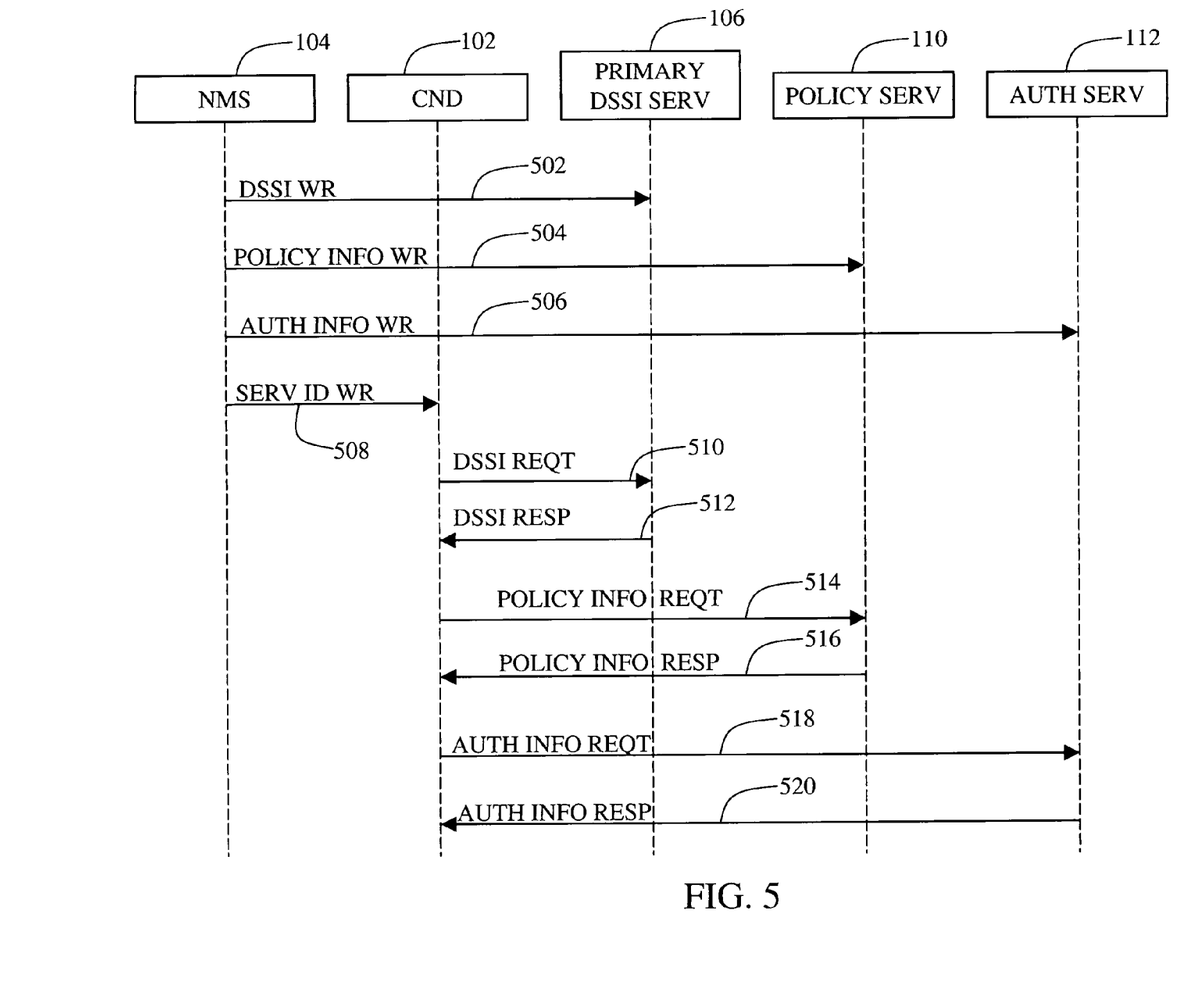
FIG. 5 is a flow diagram of the message exchange for performing the automated-configuration procedure, according to the preferred embodiment of the present invention.

Illustrated in FIG. 5 is a flow diagram of the message exchange for performing the automated DSSI setup procedure. Prior to initializing the CND, the network administrator preferably pre-loads DSS information for one or more configurable devices 102 on the primary DSSI server 106. The primary DSSI server 106 receives one or more DSSI write messages 502 sent from the network administrator 104 and used to upload and store DSS information associated with the switching device 102. A substantially identical copy of the DSS information may be uploaded to a secondary DSSI server 108.

If one or more shared resource server are employed, the shared resource information used by the switching device 102 is also uploaded to each of the one or more SRSs using one or more shared resource information write messages. Policy information, for example, is uploaded to the policy server 110 by means of one or more policy information write messages 504, and authorization information uploaded to the authorization server 112 with one or more authorization information write messages 506. In the preferred embodiment, the IP address of the policy server 110 and the IP address of the authorization server 112 constitute a form of DSS information, and are retained on the primary DSSI server 106. In the preferred embodiment, DSSI write messages are generated at the network management system 104.

With the one or more DSSI servers 106, 108 and shared resource servers 110, 112 pre-loaded DSSI, the network administrator may assign or otherwise register the network address of the primary DSSI server 106 to the associate switching device 102. Input of the DSID (step 508) may further include the input of one or more additional pieces of information, including, but not limited to, the IP address or hostname of the switching device 102A, a port number, one or more polling intervals indicating the frequency with which the switching device 102A is to poll its primary server 106, the address of a backup or secondary DSSI server 108, the number of time a DSSI server should be polled, and timeout information.

The switching device 102 is adapted to retrieve the DSS information from the primary DSSI server 106 in response to the assignment using one or more primary DSSI request messages 510. In the response returned by the DSSI server 106, primary DSSI response message 512, DSSI server 106 preferably returns substantially all DSS information for the switching device 102.

If the primary DSSI response message 512 includes the IP addresses of one or more shared resource servers, policy server or authorization server for example, one or more shared resource information (SRI) request messages are also generated. The SRI is generally transmitted back to the requesting switching device 102 in the form of one or more SRI response messages. The first SRI request message, policy request message 514, retrieves policy information from policy server 110 in the form of one or more SRI response messages 516. A second SRI request message, authorization information request message 518, retrieves security or authorization information from authorization server 112 in the form of one or more authentication information response message 520. In the preferred embodiment, the authorization information is downloaded as needed when a network administrator attempts to login to or otherwise access the switching device 102.

Figure 6A:
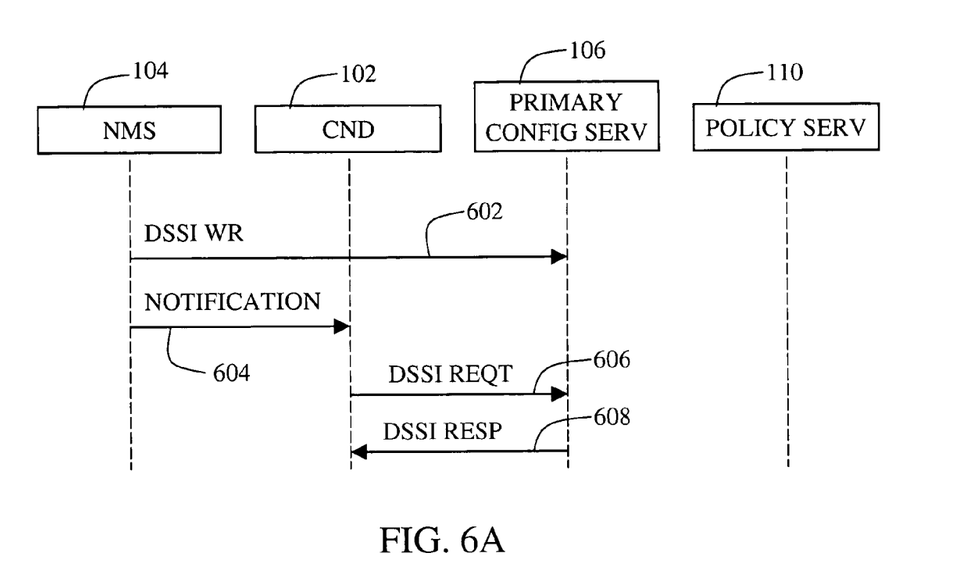
FIG. 6A is a flow diagram of the message exchange for updating DSS information at the primary DSS information server, according to the preferred embodiment of the present invention.

Illustrated in FIG. 6A is a flow diagram of the message exchange for updating DSS information at the primary DSSI server. The primary DSSI server 106 of the preferred embodiment is adapted to receive a DSSI write message 602 generated by a network administrator at NMS 104 that uploads or otherwise modifies the record of the DSSI retainer therein. The write message 602 may be followed by an update notification message 604 from the network administrator, or a notification message from the server 106, prompting CND 102, i.e. switching device, to download the modified DSS data. The switching device 102 subsequently generates a DSSI request message 606 in the preferred embodiment to elicit the one or more DSSI response messages 608 comprising the modified DSS data.

Figure 6B:
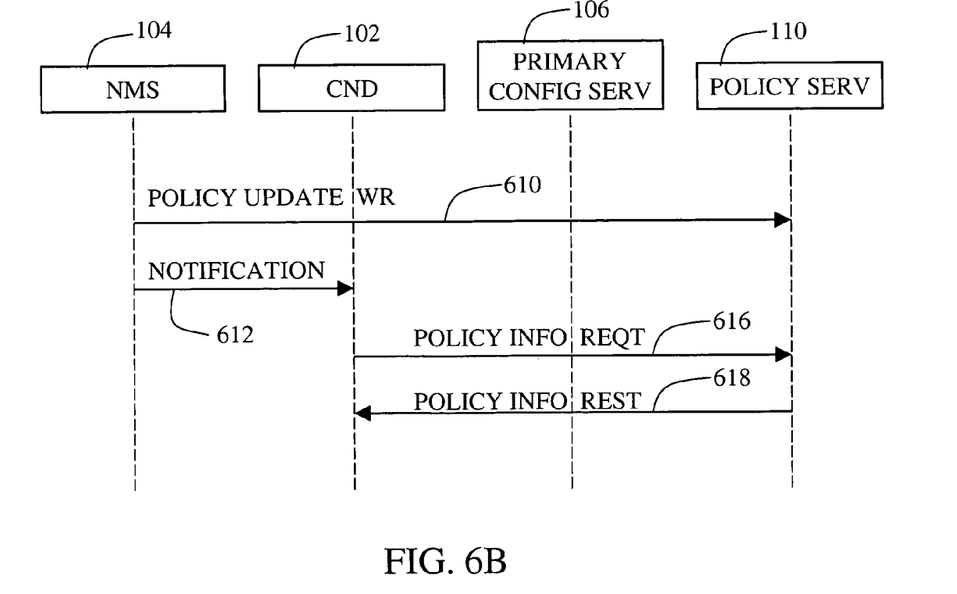
FIG. 6B is a flow diagram of the message exchange for updating shared resource information at the shared resource server, according to the preferred embodiment of the present invention.

Illustrated in FIG. 6B is a flow diagram of the message exchange for updating shared resource information at a shared resource server. The SRS 110 is adapted to receive a write message 610, generally generated by a network administrator, to modify the policy information retained therein. The write message 610 may be followed by a notification message 612 from the NMS 104, or a notification message from the server 110, prompting the switching device 102 to download the modified shared resource data. A policy request message 616 is used in the preferred embodiment to elicit the one or more response messages 618 that include the modified policy data.

One skilled in the art will appreciate that the present invention offers many advantages. For example, a network administrator is able to upload and modify DSS information for a CND without knowing the specific command structure and interface used by the device. The time required to write instructions to make or modify DSS information for the numerous switching devices available is substantially reduced. The network administrator need only know the command structure for making modifying information in the directory server, which is substantially the same in the preferred embodiment for each of the switching devices under management. In addition, a network administrator can change DSS data associated with a plurality of CNSs without issuing individual SNMP messages to each of the devices. Changes to the DSS information for the plurality of CNDs made at the DSS server are automatically made when each of the CNDs downloads its next DSSI update. As such, the present invention in its several embodiments offers, among other advantages, a substantial savings in both time and resources.

Figure 7:
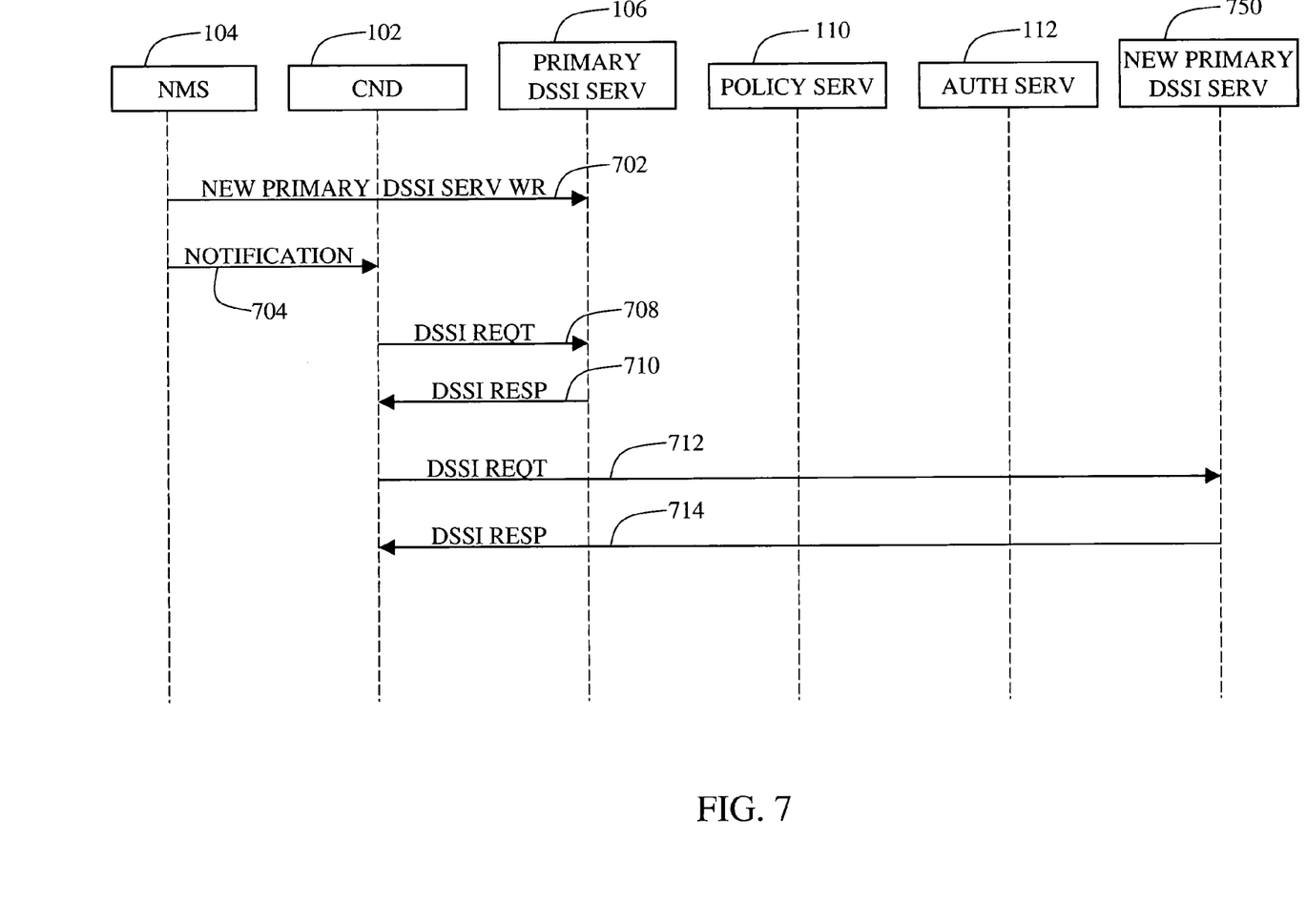
FIG. 7 is a flow diagram of the message exchange for assigning a new primary configuration server, according to the preferred embodiment of the present invention.

Illustrated in FIG. 7 is a flow diagram of the message exchange for assigning a new primary DSSI server. It may be necessary in some circumstances to change the primary DSSI server. This is quickly and efficiently achieved in the preferred embodiment by issuing a DSSI write message 702 including the network identifier of the new primary DSSI server 750. The identifier is itself an element of DSS information. As described above, the write message 702 may be followed by an update notification message 704 from the NMS 104, or an automated notification message from the DSSI server 750 or previously primary DSSI server 106, prompting the switching device 102 to download the modified new DSS data. The IP address of the new primary DSSI server 750 is preferably retained in the internal memory 230 of the switching device 102, and is used to retrieve subsequent updates. In the preferred embodiment, the next succeeding DSSI request message 712 is then automatically directed to and DSSI response 714 received from the new primary DSSI server 750 without the need for a special SNMP command issued to the configurable network device 102.

Figure 8:
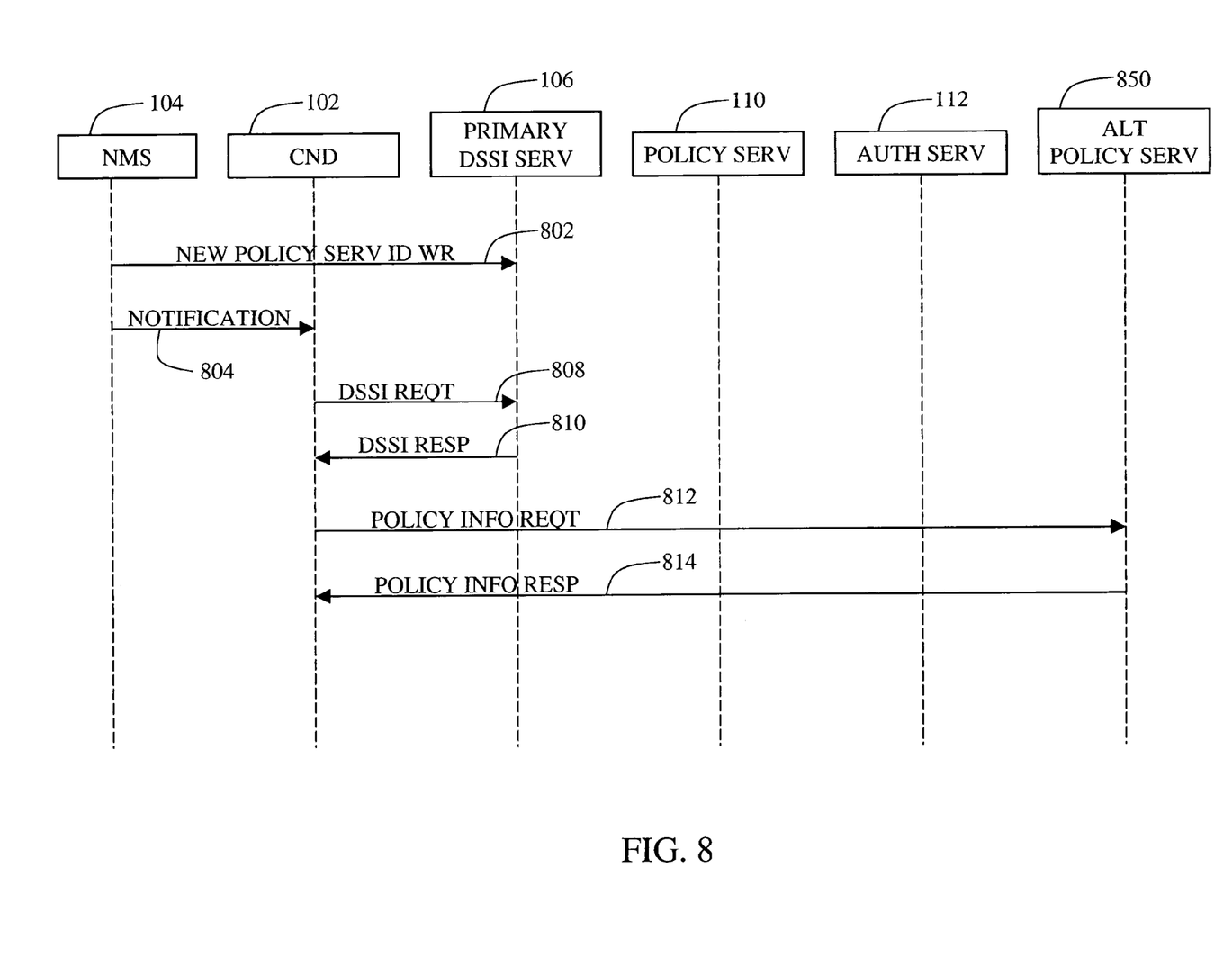
FIG. 8 is a flow diagram of the message exchange for assigning a new shared resource server, according to the preferred embodiment of the present invention.

Illustrated in FIG. 8 is a flow diagram of the message exchange for assigning a new shared resource server. It may be necessary in some circumstances to change or otherwise modify the shared resource server. This is achieved in the preferred embodiment by issuing a DSSI write message 802 including the new SRS server 850 identifier, e.g. network address, to the primary DSSI server 106. The SRS identifier used by the switching device 102, which is itself an element of DSS information, is readily changed from the original SRS 106 IP address to the IP address of an new SRS 850. As before, the write message 802 may be followed by an update notification message 804 from the NMS 104, or an automated notification message from the SRS 110 that prompts the switching device 102 to download the modified shared resource data. Upon receipt, the new SRS 850 address is preferably retained in the internal memory 230 of the switching device 102 for purposes of generating the next shared resource information request message 812 soliciting one or more shared resource information response messages 814. In the preferred embodiment, the first shared resource information response 814 preferably pulls down a complete copy of the policy information retained by the new policy server 850. needed by the switching device 102. Subsequent shared resource information request messages will be automatically be directed to the new SRS 850.

One skilled in the art will recognize that one or more steps practices by the automated setup method of the several embodiments may be implemented in software running in connection with a programmable microprocessor; implemented in hardware utilizing either a combination of microprocessors or other specially designed application-specific integrated circuits and programmable logic devices; or various combinations thereof. Thus, embodiments of the invention are not limited to any specific combination of hardware circuitry and software.

In some embodiments, the automated setup method is performed by one or more multi-layer switching devices, as defined by the Open Systems Interconnect (OSI) reference model, executing sequences of instructions retained in memory at the device or in another computer-readable medium. The term computer-readable medium as used herein refers to any medium that participates in providing instructions to one or more processors for execution. Such a medium may take many forms, including but not limited to, non-volatile media and volatile media. Non-volatile media includes, but are not limited to, hard disks, optical or magnetic disks, floppy disks, magnetic tape, or any other magnetic medium, CD-ROMs and other optical media, for example. The one or more processors and computer-readable medium may be embodies in one or more devices located in proximity to or remotely from the network administrator viewing the topology display.

Although the above description contains many specifics, these should not be construed as limiting the scope of the invention, but rather as merely providing illustrations of some of the presently preferred embodiments of this invention.

Therefore, the invention has been disclosed by way of example and not limitation, and reference should be made to the following claims to determine the scope of the present invention.

I claim:

1. An automated setup method in a first configurable network device (CND) associated with device-specific setup information (DSSI), the CND operably coupled to a distributed network comprising a DSSI server having a DSSI server identifier, a policy server having a policy server identifier, and an authentication server having an authentication server identifier, the method comprising the steps of:

storing the DSSI at the DSSI server, the DSSI comprising the policy server identifier and the authentication server identifier;

storing policy information for the CND at the policy server;

storing authentication information for the CND at the authentication server;

retrieving the DSSI for the CND from the DSSI server, wherein the DSSI includes a DSSI server identifier associated with the DSSI server, wherein retrieving the DSSI is performed using the DSSI server identifier, and wherein the DSSI includes system settings, chassis and interface settings, Internet Protocol routing information, device-specific setup (DSS) policy information, DSS authorization and security settings, accounting settings, simple network management protocol, server load balancing properties, web accesses. properties, domain name service, group mobility advertisement protocol, virtual local area network advertisement Protocol, and asynchronous transfer mode setup information;

determining that a shared resource server (SRS) having shared resource information (SRI) stored thereon is accessible by the CND, wherein said SRI is accessible from the SRS by the DSSI server dependent upon a SRS identifier included in the DSSI;

retrieving the SRI for the CND from the SRS thereby causing a local copy of the SRI and the DSSI to be retained at the CND;

repeating the DSSI retrieving step one or more times while the CND is in a standard operational state in response to determining that the SRS is not accessible by the CND;

caching the DSSI acquired in the retrieving step in a CND memory; and determining whether or not the SRS is accessible includes determining if the DSSI includes an identifier corresponding to the SRS; and after the step of retrieving the associated DSSI, determining whether the current DSSI server identifier retrieved from the DSSI server is different than a previous DSSI server identifier retained in CND memory and retrieving DSSI from the DSSI server using the current DSSI server identifier retrieved if different than the previous DSSI server identifier.

2. The automated setup method of claim 1, wherein the step of retrieving occurs automatically upon initialization and boot-up of the CND.

3. The automated setup method of claim 2, wherein the method further includes the step of retrieving policy information from the policy server using the policy server identifier retrieved from the DSSI server.

4. The automated setup method of claim 3, wherein substantially all the policy information is automatically retrieved at initialization and boot-up.

5. The automated setup method of claim 3, wherein the policy server identifier is a network address.

6. The automated setup method of claim 2, wherein the method further includes the step of retrieving authentication information from the authentication server using the authentication server identifier retrieved from the DSSI server.

7. The automated setup method of claim 6, wherein substantially all the authentication information is automatically retrieved at initialization and boot-up.

8. The automated setup method of claim 6, wherein the authentication server identifier is a network address.

9. The automated setup method in claim 1, wherein the CND is a multi-layer switching device.

10. The automated setup method of claim 9, wherein the DSSI comprises: system settings, chassis and interface settings, Internet Protocol routing information, device-specific setup (DSS) policy information, DSS authorization and security settings, accounting settings, simple network management protocol, server load balancing properties, web accesses properties, domain name service, group mobility advertisement protocol. virtual local area network advertisement Protocol, and asynchronous transfer mode setup information.

11. The automated setup method in claim 1, wherein the DSSI server is a directory server.

12. The automated setup method in claim 1, wherein the method further comprises, after the step of retrieving the associated DSSI, the steps of:

determining whether the current policy server identifier retrieved from the DSSI server is different than a previous policy server identifier retained in CND memory; and retrieving policy information from the policy server using the current policy server identifier if different than the previous policy server identifier.

13. The automated setup method in claim 1, wherein the method further comprises, after the step of retrieving the associated DSSI, the steps of:
determining whether the current authentication server identifier retrieved from the DSSI server is different than a previous authentication server identifier retained in CND memory; and
retrieving authentication information from the authentication server using the current authentication server identifier if different than the previous authentication server identifier.

14. The automated setup method in claim 1, wherein the DSSI server and the policy server are the directory server.

15. The automated setup method in claim 1, wherein the DSSI server and the policy server are different servers.

16. A configurable network device (CND) associated with device-specific setup information (DSSI); wherein the CND is operably coupled to a distributed network comprising a DSSI server with an associated DSSI server identifier, a policy server with an associated policy server identifier, and an authentication server with an associated authentication server identifier, the CND comprising:
a local memory for retaining the DSSI server identifier;
an update manager comprising:
retrieving the DSSI associated with the CND from the DSSI server using the DSSI server identifier, wherein the DSSI comprises the policy server identifier and wherein the DSSI includes system settings, chassis and interface settings, Internet Protocol routing information, device-specific setup (DSS) policy information, DSS authorization and security settings, accounting settings, simple network management protocol, server load balancing properties, web accesses properties, domain name service, group mobility advertisement protocol, virtual local area network advertisement Protocol, and asynchronous transfer mode setup information;
caching, in the local memory, the DSSI acquired in the DSSI retrieving step;
retrieving the SRI for the CND from the SRS in response to determining that a shared resource server (SRS) having shared resource information (SRI) stored thereon is accessible by the CND, wherein determining that the SRS is accessible includes determining the DSSI includes an identifier corresponding to the SRS;
caching, in the local memory, the SRI acquired at the SRI retrieve step thereby causing a local copy of the SRI and the DSSI to be retained at the CND;
retrieving policy information from the policy server using the policy server identifier;
caching, in the local memory, the policy information acquired in the policy retrieving step;
repeating the DSSI retrieving step one or more times while the CND is in a standard operational state in response to determining that the SRS is not accessible by the CND;
caching the DSSI acquired in the retrieving step in a CND memory;
determining whether or not the SRS is accessible includes determining if the DSSI includes an identifier corresponding to the SRS; and
after the step of retrieving the associated DSSI, determining whether the current DSSI server identifier retrieved from the DSSI server is different than a previous DSSI server identifier retained in CND memory and retrieving DSSI from the DSSI server using the current DSSI server identifier retrieved if different than the previous DSSI server identifier.

17. The configurable network device of claim 16, wherein the update manager is further adapted for:
retrieving authentication information from the authentication server using the authentication server identifier in the DSSI; and
caching, in the local memory, the authentication information acquired in the authentication retrieving step.

* * * * *